US006805471B2

(12) United States Patent
Strelnieks

(10) Patent No.: US 6,805,471 B2
(45) Date of Patent: Oct. 19, 2004

(54) FLEXIBLE HANGER FOR CHANDELIERS AND THE LIKE

(76) Inventor: John Strelnieks, 3850 Wind Drift Dr., Apt. 2C, Indianapolis, IN (US) 46254

( * ) Notice: Subject to any disclaimer, the term of this patent is extended or adjusted under 35 U.S.C. 154(b) by 105 days.

(21) Appl. No.: 10/347,916

(22) Filed: Jan. 20, 2003

(65) Prior Publication Data

US 2003/0112630 A1 Jun. 19, 2003

Related U.S. Application Data

(63) Continuation of application No. PCT/US01/41308, filed on Jul. 9, 2001.

(51) Int. Cl.[7] .............................................. F21V 21/16
(52) U.S. Cl. ...................... 362/407; 362/408
(58) Field of Search ................. 362/404, 407, 362/408

(56) References Cited

U.S. PATENT DOCUMENTS

| 909,405 | A | | 1/1909 | Handel |
|---|---|---|---|---|
| 1,187,122 | A | | 1/1916 | Andersen |
| 1,430,402 | A | | 9/1922 | Perry |
| 1,718,368 | A | | 6/1929 | Laupot |
| 3,813,478 | A | * | 5/1974 | Ervin .......................... 362/408 |

* cited by examiner

Primary Examiner—Stephen F. Husar
(74) Attorney, Agent, or Firm—Woodard, Emhardt, Moriarty, McNett & Henry LLP

(57) ABSTRACT

An overhead lighting fixture is hung from an overhead structure (11) using a combination including a hanger (12) secured to the overhead structure, a chain (31) having a plurality of links with the top link (32) connected to the hanger, and a lighting device (17) connected to at least one of the links, usually the bottom link (33) of the chain. An electrical supply cord is made inconspicuous or hidden. This is done as it extends down from the hanger (12) through the center of the chain (31) throughout the length of the chain and entirely within an unobstructed space within the chain to supply the lighting device (17) connected to the bottom link of the chain. Another approach is a sleeve (57) encompassing the chain (51, 52, 53, 54) and cord (56) combination. The chain is such that, when hanging from the hanger, it is flexible in primarily two vertical planes perpendicular to each other but at least moderately flexible in all vertical planes.

18 Claims, 6 Drawing Sheets

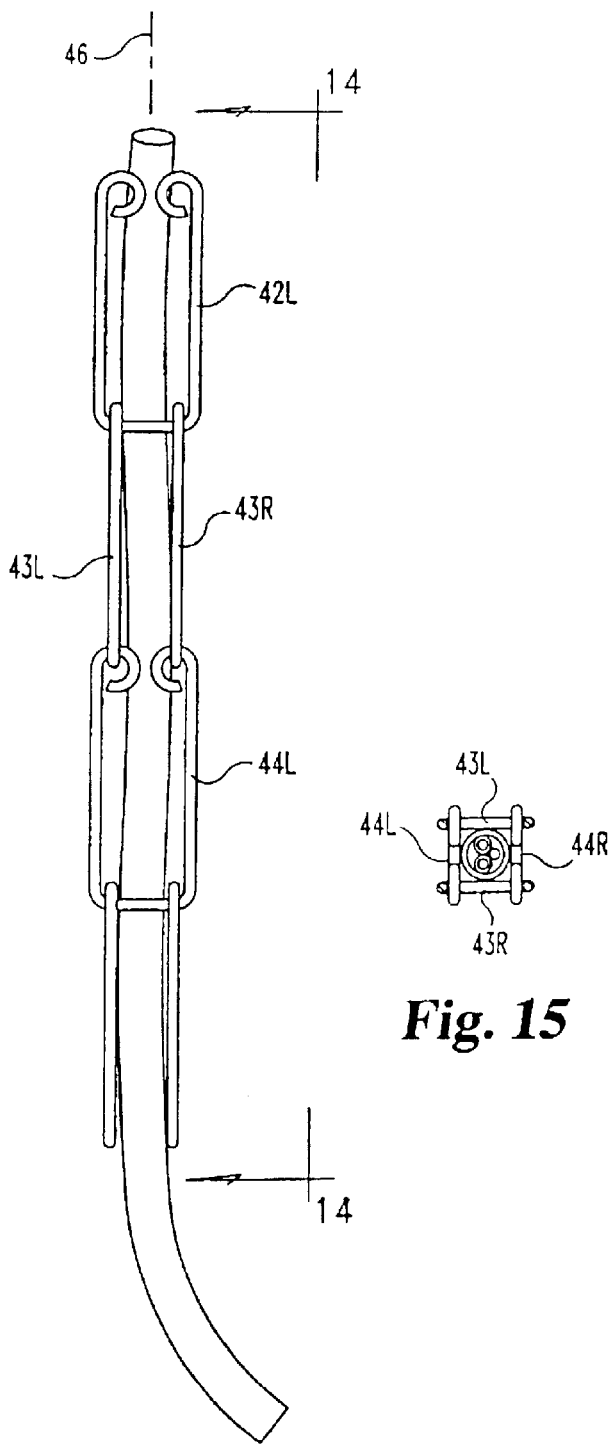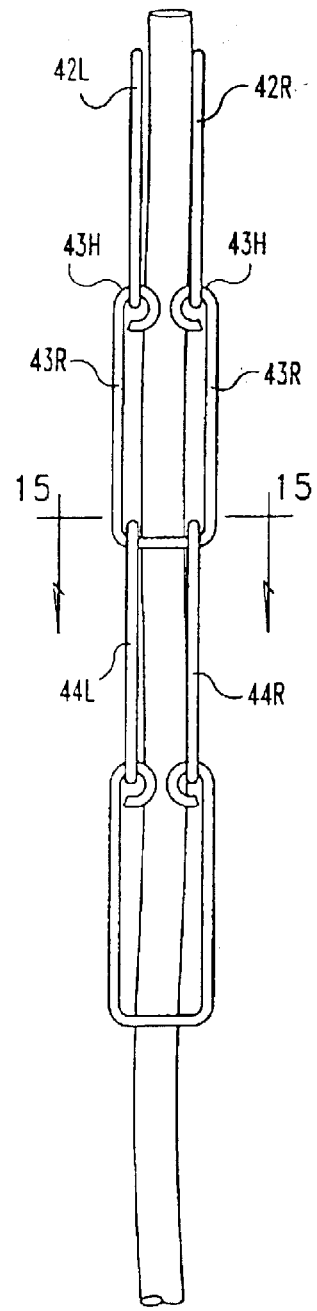
Fig. 15
Fig. 13
Fig. 14

Fig. 19 Fig. 20

FLEXIBLE HANGER FOR CHANDELIERS AND THE LIKE

This application is a continuation of PCT/US01/41308 filed Jul. 9, 2001.

BACKGROUND OF THE INVENTION

This invention relates generally to lighting fixtures, and more particularly to chains for hanging lighting fixtures from a ceiling or overhead structure.

DESCRIPTION OF THE PRIOR ART

Lighting devices hung from overhead supports are usually hung by a chain of some type. The electrical supply to the device is provided by two or three wires or a single cord having two or three wires encased in it. Sometimes these cords may be gold colored or essentially transparent with the conductors visible through them. Typically, the cord is threaded up through and around the chain links. To some observers, such cords are very noticeable and detract from the appearance of the fixture.

Over the years, various chain-type arrangements or cord coloring or treatments have been used to somewhat conceal the cord. Examples of various chain arrangements in which the cord is directed down through the center of the chain, are found in U.S. Pat. No. 909,405 issued Jan. 12, 1909 to Handel; U.S. Pat. No. 1,187,122. issued to Anderson on Jun. 13, 1916; U.S. Pat. No. 1,528,871, issued Mar. 10, 1925 to Benjamin; U.S. Pat. No. 1,702,502, issued Feb. 19, 1929 to D'Olier, Jr.; U.S. Pat. No. 1,718,368, issued Jun. 25, 1929 to Laupot; U.S. Pat. No. 3,664,619, issued May 23, 1972 to Heidrich et al.; and U.S. Pat. No. 3,771,309, issued Nov. 13, 1973 to Peters. In this group although the arrangements shown in the Handel, Anderson, Benjamin '871 appear to be flexible, and have the lamp cord passing directly through the center, they are not truly flexible in the sense of being readily rolled-up in the nature of the usual chain. In the U.S. Pat. No. 1,430,402, issued Sep. 26, 1922 to Perry and U.S. Pat. No. 1,492,014 issued Apr. 29, 1924 to Benjamin, the cord is not surrounded by the chain throughout its length. In the Heidrich et al. and a U.S. Pat. No. 3,771,309 to Peters, the chain components are of somewhat unusual shape. Those in Heidrich would appear to be relatively expensive. Also the Heidrich et al. chain is flexible only in one plane. It is an object of the present invention to provide a flexible chain made of simple and inexpensive components together with an electrical supply cord handled in a way adapted to make the cord inconspicuous or hidden.

SUMMARY OF THE INVENTION

Described briefly, according to illustrated embodiments of the present invention, an overhead lighting fixture is hung from an overhead structure using a combination including a hanger secured to the overhead structure, a chain having a plurality of links with the top link connected to the hanger, and a lighting device connected to at least one of the links, usually the bottom link of the chain. An electrical supply cord extends down from the hanger to supply the lighting device connected to the bottom link of the chain. In one embodiment, the cord extends through the center of the chain throughout the length of the chain and entirely within an unobstructed space within the chain. In another embodiment the cord is woven through the links which are sheathed by a decorative sleeve. In still another embodiment, the cord passes straight down beside the links in an unobstructed space between the links and the decorative sleeve. The chain is such that, when hanging from the hanger, the chain is flexible in primarily two vertical planes perpendicular to each other, and the chain is at least moderately flexible in all vertical planes.

BRIEF DESCRIPTION OF THE DRAWINGS

FIG. 13 is an elevational view on the same scale as in FIGS. 2 and 6 and showing another alternate chain link assembly.

FIG. 14 is a view at 90° on the axis of the chain assembly viewed in the direction of the arrows 14—14 in FIG. 13.

FIG. 15 is a cross sectional view of a junction of links, taken at line 15—15 in FIG. 14 and viewed in the direction of the arrows.

FIG. 19 is a cross sectional view taken at line 19—19 in FIG. 17 and 19—19 in FIG. 18 and viewed in the direction of the arrows.

FIG. 20 is a view of one of the identical chain links used in the embodiment of FIGS. 16, 17 and the embodiment of FIG. 18.

DESCRIPTION OF THE ILLUSTRATED EMBODIMENT

Figure 1:
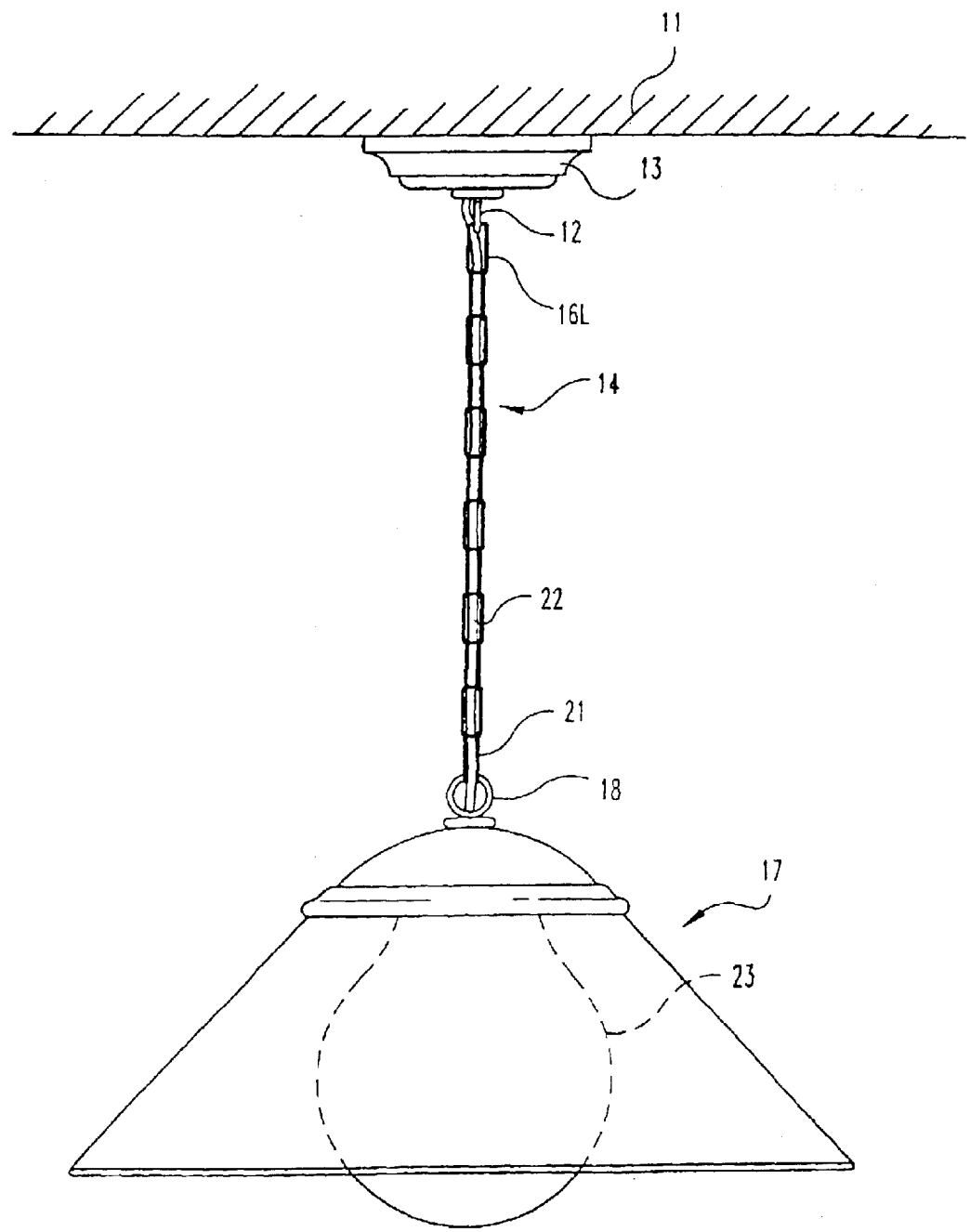
FIG. 1 is a view of a hanging lighting fixture installation.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, an overhead support 11 is shown with a hanger hook or loop 12 which is fixed to an electrical junction box (not shown) in the ceiling in conventional manner and surrounded by a bezel 13. The chain assembly 14 is hung from the hanger 12 with the top link 16 hooked to the hanger 12 and the remaining links hanging downward from there. The lamp assembly 17 has a loop 18 at the top of it affixed to it and hanging on the bottom link 21 of the chain assembly 14. An electric supply cord 22 is received down through the chain assembly to power the light bulb 23.

Figure 2:
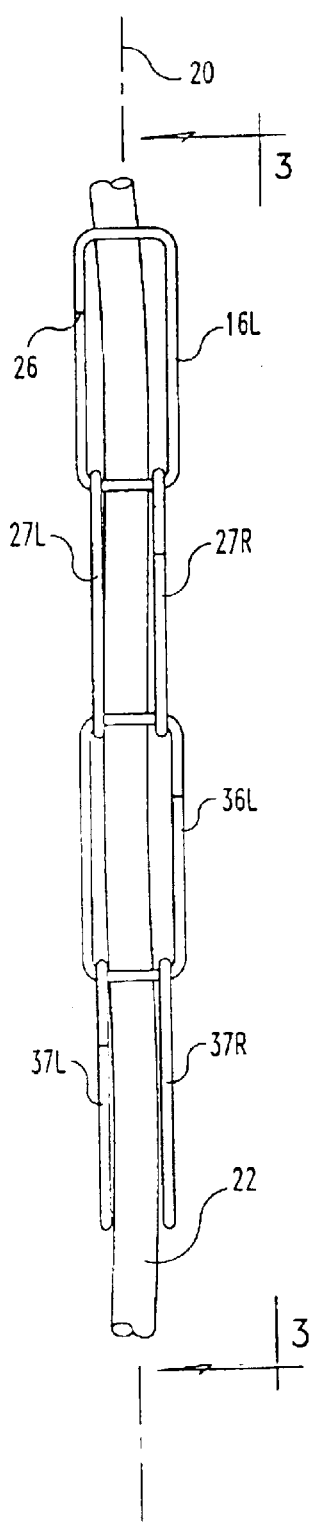
FIG. 2 is an enlarged fragmentary elevational view thereof.
Figure 3:
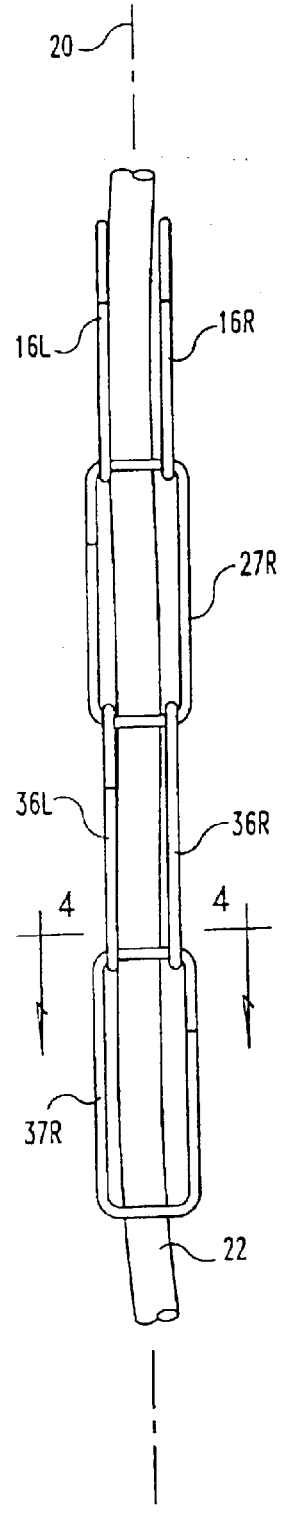
FIG. 3 is a view like FIG. 2 taken at line 3—3 in FIG. 2 and viewed in the direction of the arrows.
Figure 4:
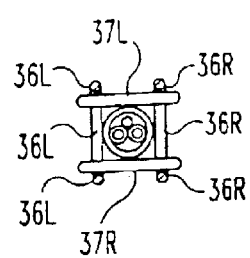
FIG. 4 is a cross sectional view of a junction of links, taken at line 4—4 in FIG. 3 and viewed in the direction of the arrows.

Referring now to FIGS. 2 through 4, the chain is a series of links which are identical and formed from wire into a rectangular loop with the ends of the loop butt-welded together at 26. All of these links are identical. As shown in FIG. 3, the top links 16L and 16R are in parallel horizontally-spaced relationship to each other. The next adjacent links 27L and 27R in the series are also disposed in parallel horizontally-spaced relationship as shown in FIG. 2. The links 27L and 27R lie in vertical planes perpendicular to the vertical planes in which links 16L and 16R lie. Each link 27 is looped around the lower end of the two links 16. Thus, links 27 are in horizontally-spaced vertical planes as are links 16, but oriented 90° about the longitudinal axis 20 of the chain assembly. Chain links 36 are oriented in the same relationship as are links 16. Links 37 are oriented in the same relationship as links 27. Postscripts "L" and "R" are used with reference to some of the links in the chains for clarity in the cross sectional view such as FIG. 4.

The electrical cable 22 as illustrated herein is a three-wire cable and of a diameter of approximately 0.25 inches. The cross sectional area of the clear space, from the top links 16 of the chain to the bottom links 21 of the chain is only slightly larger than the cable so that there is a sliding fit of the cord or cable 22 in the clear space. It is intended to thereby have the electric cord run straight down the middle of the chain assembly along its axis 20 without curves in the cord. At the same time, since the cord itself is flexible, the chain is quite flexible in two vertical planes, namely the plane of the paper in each of the FIG. 2 and FIG. 3 illustrations. In other words, the chains are flexible about the axes of the horizontal portions of the links. Also because the links are not rigidly attached to each other lengthwise, there is also some flexibility in the horizontal direction about various vertical planes other than the two specifically mentioned above. The greatest flexibility, of course, is about those planes perpendicular to the horizontal portions of the links.

Figure 5:
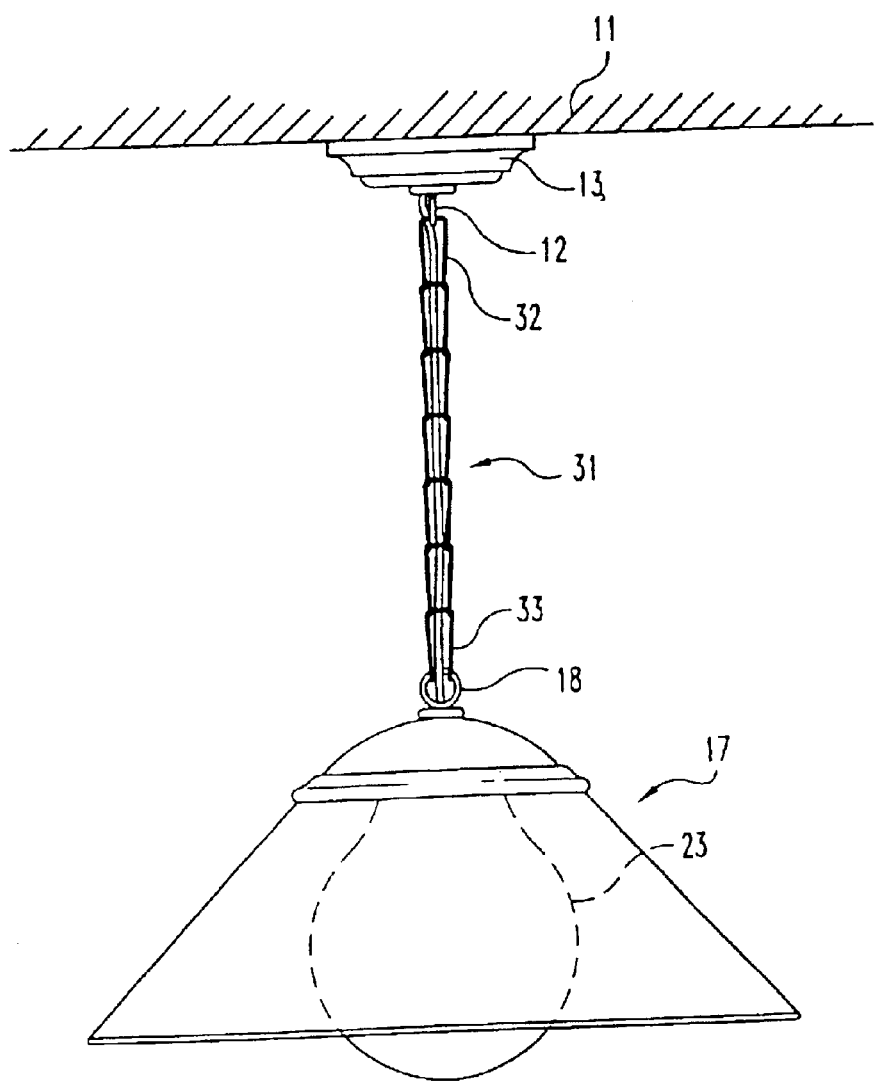
FIG. 5 is a view like FIG. 1 but showing a second embodiment of the present invention.

Referring now to FIG. 5, in which the same general organization of supports is provided, the hanger connector 12 is fastened to the junction box (not shown) and has a bezel 13 around it. The lamp 17 has the connector ring or loop or hook 18 secured to the top. The chain assembly 31 has its top link 32 connected to the hanger 12 and the bottom link 33 connected to the hook or ring 18 on the lamp.

Figure 6:
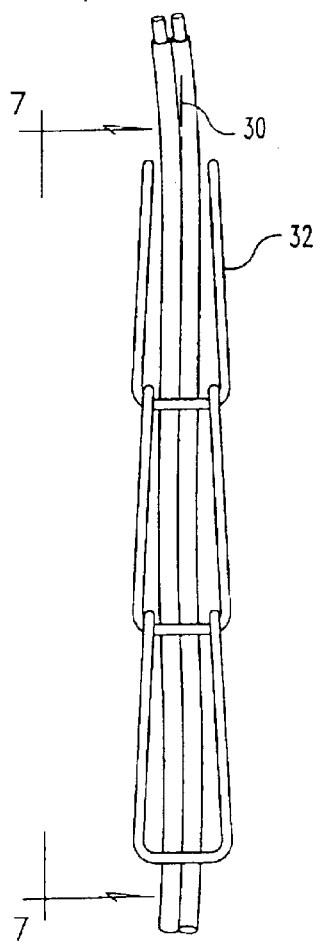
FIG. 6 is an enlarged fragmentary elevational view of the chain and cord assembly.
Figure 7:
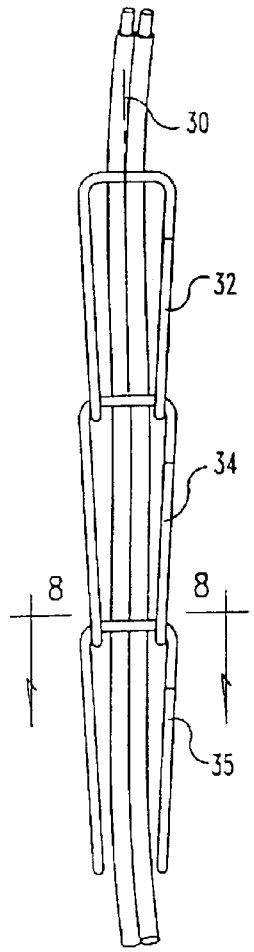
FIG. 7 is a view like FIG. 6 except rotated 90° about the axis of the chain and viewed in the direction of the arrows 7—7 in FIG. 6.
Figure 8:
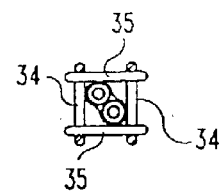
FIG. 8 is a cross section of a junction of links, taken at line 8—8 in FIG. 7 and viewed in the direction of the arrows.
Figure 9:
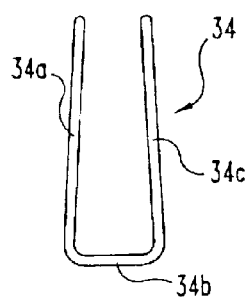
FIG. 9 is an elevational view of the link itself.
Figure 10:
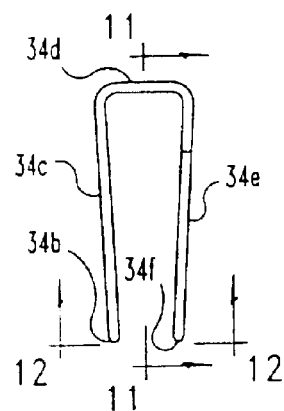
FIG. 10 is a view of the same link rotated 90° on its longitudinal axis.
Figure 11:
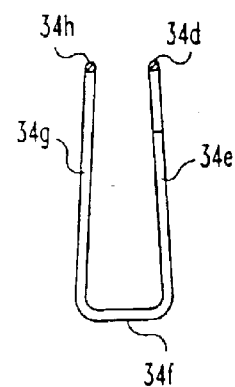
FIG. 11 is a sectional view taken at line 11—11 in FIG. 10 and viewed in the direction of the arrows.
Figure 12:
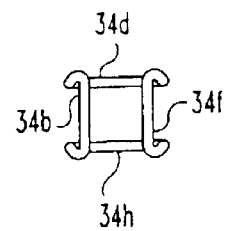
FIG. 12 is a bottom view of the link viewed in the direction of the arrows 12—12 in FIG. 10.
Figure 16:
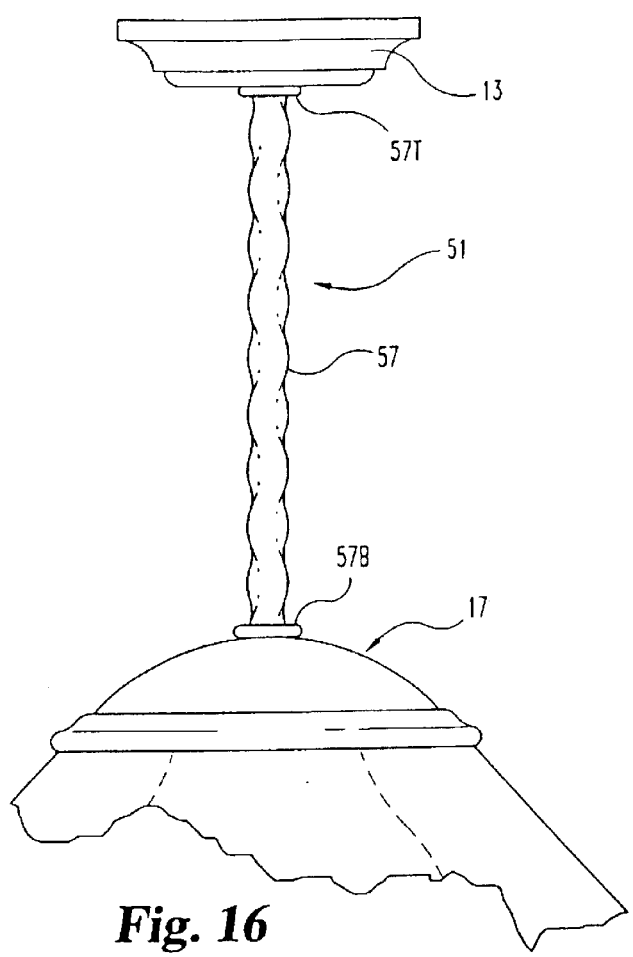
FIG. 16 is an elevational view of a portion of the assembly according to another embodiment of the invention, which includes a sleeve along the length of the chain from the ceiling to the light fixture such as in FIG. 1.

Referring now to FIG. 6 through FIG. 12, along with FIG. 5, all of the links of this chain assembly 31 are identical. In this case, because of the unique shape of the links, instead of pairs of links in series, there are only single links in sequence in the series. Each link is made of a single piece of a wire that, viewed in one direction as shown in FIGS. 6 and 9, form a U, and viewed in a direction 90° from the first direction such as at line 7—7 in FIG. 6, they form an inverted U-shape. Also, each of the links in this chain is oriented in exactly the same direction as every other link. Thus, the two lines designated 34 in FIG. 8 are for one other link. Similarly, the two lines designated 35 in FIG. 8 are for one other link. In this instance, the electric cord is a flat two-wire cord which is snugly fit within the open space. Since the cord is flat, the boundaries slidingly engaged by the cord are in a square. If this particular chain assembly is to be used with a round cord, it will occupy the open space in the same way as the round cord in the chain of FIGS. 1 through 4.

Views of the single link such as 34 are shown in FIGS. 9 through 12 with postscripts "a" through "h" for the reference numeral, to relate the various portions of the wire to each other in the views. Referring now to FIGS. 13 through 15, this third embodiment of the invention is employed in the same manner as those in FIGS. 1 and 6. In this instance, each of the links is identical to each other link. But, as in the first-described chain, the links are used in pairs in sequence, with alternate pairs rotated 90° about the axis of the chain. For example, links 42 are in vertical planes which are horizontally spaced as best shown in FIG. 14. Each of the links is made of wire formed in a U-shape with an inward and downwardly turning loop at the top of each arm of the "U". For example, link 43R is shown in its entirety in FIG. 14 and has two loops 43H, one at the top of each of the arms of the "U". These loops wrap around the lower horizontal base or bottom of one or the other of the links 42L and 42R.

The appearance of the cross section of a junction between two links and the next two adjacent links in the series, is shown in FIG. 15 and is similar to FIG. 4. The size of the open space or channel down through the chain along the axis 46 is sufficient to accommodate in a sliding fit, a ¼ inch diameter electric cord in a sliding fit. Therefore, whether the channel is square as shown with a dimension across the faces of the square at 0.25 inches, or whether it would be some other cross sectional shape due to some slight variation in the shape of the links, it is still intended that it be a sliding fit to maintain the cord in a straight, rather than curved condition, in the passageway, so that it presents a very neat and straight line appearance, as shown in these drawings. For a 0.250 outside diameter cable, the cross sectional area of the clearance space at the chain inter-link junctions should be no more than 0.0625 inches.

Figure 17:
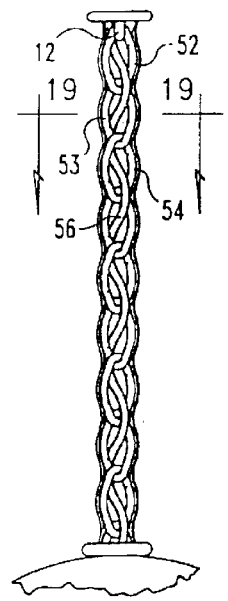
FIG. 17 is a fragmentary view of the construction used in FIG. 16, but with the decorative sleeve shown in cross section.
Figure 18:
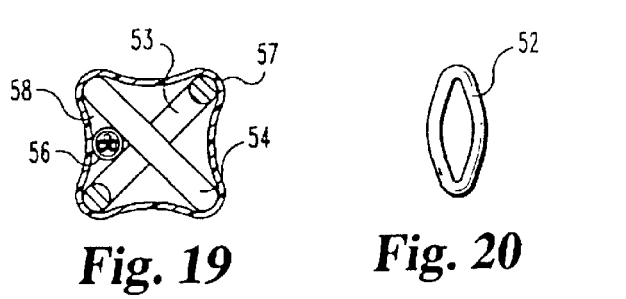
FIG. 18 is a view like FIG. 17 but showing an embodiment in which the electric supply cord runs straight down beside the chain links through an open space between the links and a decorative sleeve shown in cross section.
Figure 18:
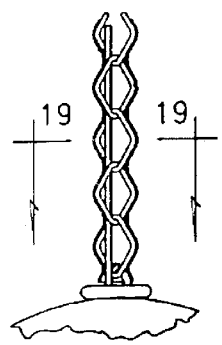

Referring now to FIGS. 16 through 20, the apparatus includes a bezel 13 with a hanger loop 12 as in the previously described embodiments. The chain assembly 51 is hung, from the loop 12 by a series of links 52 made of wire in the same general manner as described in the previously described embodiment of FIG. 1, for example, but with only one series of links interconnected together. The bottom link is connected to a loop 18 at the top of the lamp assembly (loop 20 not shown in FIG. 16, but handled in the same manner as in the previously described embodiments). It is preferable that the chain links be elongate diamond shaped with the tops and bottoms of the links narrow (less than 60 degrees included angle) as shown in FIG. 20 so as to minimize the chain twisting, and to gravity bias them to align adjacent links perpendicular to each other as viewed from above, as shown in the cross section of FIG. 19 where two adjacent links are shown at right angles and identified by the reference numerals 53 and 54. These links should be understood to be identical to link 52 but given the numbers 53 and 54 to relate them better between FIGS. 17 and 20 of the drawings. In FIG. 17, the electric cord 56 is threaded through the links from the junction box (not shown) in the ceiling to the lamp fixture below. Although the cord is in a somewhat serpentine configuration as the result of threading it through the links in this embodiment, that is hidden by the fact that there is a sleeve 57 surrounding the chain and cord combination from the top 57T to the bottom 57B. This sleeve covers the entire chain from the top to the bottom and hides it as well as the electric cord running through it. The sleeve is preferably made of a heat shrinkable plastic. An example is the type used on bicycle lock chains. It may be opaque or of some decorative translucent or transparent plastic material. In the FIG. 18 embodiment everything is the same as in FIGS. 16, 17, 19 and 20, except that the electric cord is not threaded through the links. Instead, it runs straight down through the open space 58 (FIG. 19) beside the links confined by sheath 57.

The links may be made of any convenient material. A metal with decorative plating is preferred, although molded plastics might also be used, particularly where such materials can be expected to support the weight of the fixture, whether it be a lamp, a multi-lamp chandelier, or other electrical device to which power is to be delivered by the cord. In these embodiments of FIGS. 17 and 18 of the invention, because of the arrangement and diamond shape of the links with acute angles at the top and bottom of the links, the chain is flexible primarily in two perpendicular vertical planes but is at least moderately flexible in all vertical planes While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
   a chain assembly of a plurality of links, each of said links being formed to interconnect with other links in a series, and formed such that when interconnected in series along an axis, to form a chain having first and second ends, they provide a continuous open passageway extending from the first end of the chain to the second end of the chain, said passageway being oriented in the same direction as said axis.
   an electric power conductor extending through the full length of the chain;
   a hanger connected to an overhead support and connected to the first end of the chain to hang the chain from the support; and
   an electric light connected to the second end of the chain, and to the electric power conductor; said links being sized to size the passageway to slidably admit said electric power conductor adequate to supply said electric light;
   wherein said chain links being connected in series for flexibility in two vertical planes which are perpendicular to each other and the links are arranged in series, each link being oriented in the same direction as the next adjacent link in the series, and wherein each link is one continuous piece of wire defining a cubical space by first and second generally parallel vertical planes, third and fourth generally parallel vertical planes perpendicular to said first and second planes, and first and second horizontal parallel planes intersecting said vertical planes, the spacing between said horizontal planes exceeding the spacing between said vertical planes,
   the wire having a generally U-shaped configuration in said first and second vertical planes, and an inverted U-shaped configuration in said third and fourth vertical planes.

2. The apparatus of claim 1, wherein the passageway is straight and centers on an axis through said hanger and said lighting device.

3. The apparatus of claim 1, wherein said links are sized so that the passageway has a maximum cross-sectional area of 0.0625 square inches at the inter-link junctions.

4. The apparatus of claim 1, wherein the links are provided in successive pairs in series, each pair being oriented 90 degrees about said axis, relative to the next adjacent pair.

5. The apparatus of claim 1, further comprising means associated with said chain for making the cord inconspicuous.

6. The apparatus of claim 5, wherein the means for making the cord inconspicuous is a sleeve of heat shrinkable material.

7. Connecting apparatus for an electric light or the like comprising:
   a chain assembly of a plurality of links, each of said links being formed to interconnect with other links in a series, and formed such that when interconnected in series along an axis, to form a chain having first and second ends, they provide a continuous open passageway extending from the first end of the chain to the second end of the chain, said passageway being oriented in the same direction as said axis,
   wherein each link is one continuous piece of wire defining a cubical space by first and second generally parallel vertical planes, third and fourth generally parallel vertical planes perpendicular to said first and second planes, and first and second horizontal parallel planes intersecting said vertical planes, the spacing between said horizontal planes exceeding the spacing between said vertical planes,
   the wire having a generally U-shaped configuration in said first and second vertical planes, and an inverted U-shaped configuration in said third and fourth vertical planes.

8. The apparatus of claim 7, wherein the passageway is straight and centers on an axis through said hanger and said lighting device.

9. The apparatus of claim 7, wherein said links are sized so that the passageway has a maximum cross-sectional area of 0.0625 square inches at the inter-link junctions.

10. The apparatus of claim 7, wherein the links are provided in successive pairs in series, each pair being oriented 90 degrees about said axis, relative to the next adjacent pair.

11. The apparatus of claim 7, further comprising means associated with said chain for making the cord inconspicuous.

12. The apparatus of claim 11, wherein the means for making the cord inconspicuous is a sleeve of heat shrinkable material.

13. An ambient lighting combination for overhead lighting comprising:
    a hanger;
    a chain having a plurality of links;
    a lighting device connected to at least one of said links;
    an electrical supply cord extending down from the hanger to the lighting device and entirely within an unobstructed space associated with the chain,
    wherein each link is one continuous piece of wire defining a cubical space by first and second generally parallel vertical planes, third and fourth generally parallel vertical planes perpendicular to said first and second planes, and first and second horizontal parallel planes intersecting said vertical planes, the spacing between said horizontal planes exceeding the spacing between said vertical planes, the wire having a generally U-shaped configuration in said first and second vertical planes, and an inverted U-shaped configuration in said third and fourth vertical planes.

14. The apparatus of claim 13, wherein said space is straight and centers on an axis through said hanger and said lighting device.

15. The apparatus of claim 13, wherein said links are sized to provide a continuous open passageway whose maximum cross-sectional area is 0.0625 square inches at the inter-link junctions.

16. The apparatus of claim 13, wherein the links are provided in successive pairs in series, each pair being oriented 90 degrees about said axis, relative to the next adjacent pair.

17. The apparatus of claim 13, further comprising means associated with said chain for making the cord inconspicuous.

18. The apparatus of claim 17, wherein the means for making the cord inconspicuous is a sleeve of heat shrinkable material.

\* \* \* \* \*